(12) United States Patent
Katrak (10) Patent No.: US 10,664,373 B2
(45) Date of Patent: May 26, 2020

(54) SELF-DIAGNOSING MICROCONTROLLER FOR READING CORRECT CHANNELS OF AN ANALOG-TO-DIGITAL CONVERTER

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 210 days.

(21) Appl. No.: 16/028,500

(22) Filed: Jul. 6, 2018

(65) Prior Publication Data

US 2019/0034307 A1 Jan. 31, 2019

Related U.S. Application Data

(60) Provisional application No. 62/539,271, filed on Jul. 31, 2017.

(51) Int. Cl.
*G06F 11/22* (2006.01)
*G06F 11/26* (2006.01)

(52) U.S. Cl.
CPC .......... *G06F 11/26* (2013.01); *G06F 11/2236* (2013.01)

(58) Field of Classification Search
CPC ............................ G06F 11/26; G06F 11/2236

USPC ......................................................... 714/740
See application file for complete search history.

(56) References Cited

U.S. PATENT DOCUMENTS

| | | | |
|---|---|---|---|
| 9,111,047 B1* | 8/2015 | Shridhar | G06F 13/40 |
| 10,027,989 B2* | 7/2018 | Doshi | H04N 19/40 |
| 2008/0107138 A1 | 5/2008 | Tseng et al. | |
| 2012/0082273 A1 | 4/2012 | Chang | |
| 2013/0250976 A1* | 9/2013 | Lindner | H04J 3/1688 370/509 |
| 2015/0092877 A1* | 4/2015 | Sivaprakasam | H04L 1/006 375/267 |

* cited by examiner

*Primary Examiner* — Albert Decady
*Assistant Examiner* — Enam Ahmed
(74) *Attorney, Agent, or Firm* — Buckert Patent & Trademark Law Firm PC; John F. Buckert (57) ABSTRACT

A self-diagnosing microcontroller includes a microprocessor having first and second applications, and a hardware abstraction layer. The microprocessor is operably coupled to an analog-to-digital converter. The hardware abstraction layer sequentially sets a first pre-check indicator to a first fault value for each encoded channel number of a second plurality of encoded channel numbers that does not have an identical and corresponding encoded channel number in a first plurality of encoded channel numbers indicating an incorrect channel was read from the analog-to-digital converter, and sends the first pre-check indicator to the first application.

10 Claims, 8 Drawing Sheets

FIRST TABLE

| ENCODED CHANNEL NUMBER | CHANNEL NUMBER |
|---|---|
| D4 | 1 |
| 71 | 2 |

FIG. 4

SECOND TABLE

| CHANNEL NUMBER | ENCODED CHANNEL NUMBER |
|---|---|
| 1 | D4 |
| 2 | 71 |

SELF-DIAGNOSING MICROCONTROLLER FOR READING CORRECT CHANNELS OF AN ANALOG-TO-DIGITAL CONVERTER

CROSS-REFERENCE TO RELATED APPLICATION

This application claims priority to U.S. Provisional Patent Application No. 62/539,271 filed on Jul. 31, 2017, the entire contents of which are hereby incorporated by reference herein.

BACKGROUND

The inventor herein has recognized a need for a self-diagnosing microcontroller that can confirm whether correct channels in an analog-to-digital converter are being read, and setting a pre-check indicator associated with all of the channels in the analog-to-digital converter to a fault value if a fault condition is detected.

SUMMARY

A self-diagnosing microcontroller in accordance with an exemplary embodiment is provided. The self-diagnosing microcontroller includes a microprocessor having first and second applications, and a hardware abstraction layer. The microprocessor is operably coupled to a first analog-to-digital converter. The first application sequentially sends each encoded channel number of a first plurality of encoded channel numbers associated with the first analog-to-digital converter to the hardware abstraction layer. The hardware abstraction layer sequentially determines each channel number of a first plurality of channel numbers utilizing an associated encoded channel number of the first plurality of encoded channel numbers and sequentially reads associated voltages at a plurality of channels of the first analog-to-digital converter utilizing the first plurality of channel numbers. The hardware abstraction layer sequentially determines each encoded channel number of a second plurality of encoded channel numbers utilizing an associated channel number of the first plurality of channel numbers. The hardware abstraction layer sequentially sets a first pre-check indicator to a first fault value for each encoded channel number of the second plurality of encoded channel numbers that does not have an identical and corresponding encoded channel number in the first plurality of encoded channel numbers, and sends the first pre-check indicator to the first application.

DETAILED DESCRIPTION

Figure 1:
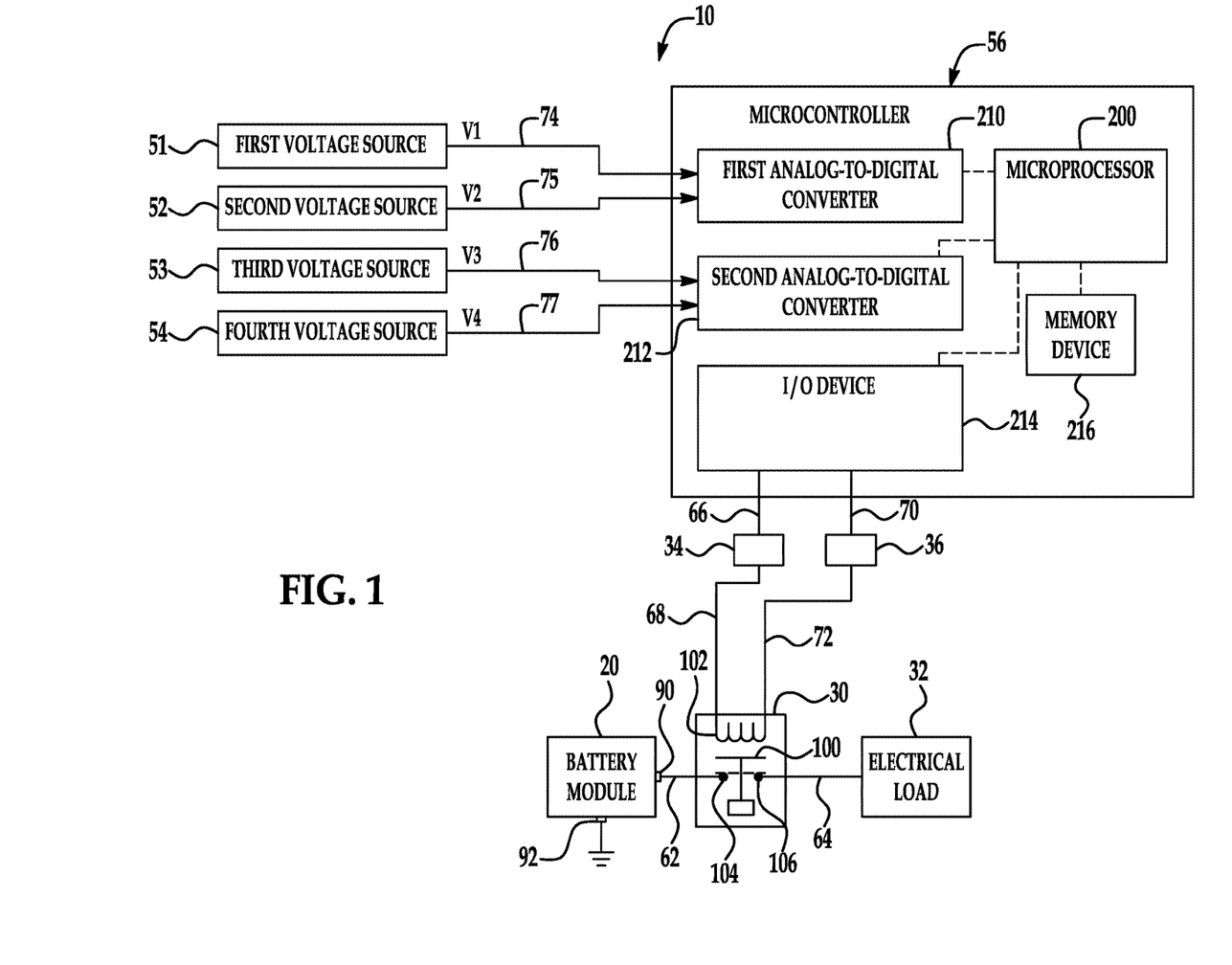
FIG. 1 is a schematic of a vehicle having a self-diagnosing microcontroller in accordance with an exemplary embodiment.

Referring to FIG. 1, a vehicle 10 is provided. The vehicle 10 includes a battery module 20, a contactor 30, a voltage driver 34, a voltage driver 36, electrical lines 62, 64, 66, 68, 70, 72, 74, 75, 76, 77, a first voltage source 50, a second voltage source 52, a third voltage source 53, a fourth voltage source 54, and a self-diagnosing microcontroller 56 in accordance with an exemplary embodiment.

An advantage of the self-diagnosing microcontroller 56 is that the microcontroller 56 utilizes first and second applications to each confirm whether correct channels in an analog-to-digital converter are being read, and sets first and second pre-check indicators (each associated with all of the channels in the analog-to-digital converter) to a fault value if incorrect channels are being read from the analog-to-digital converter.

For purposes of understanding, a few terms utilized herein will be explained.

The term "node" is a region or a location in an electrical circuit.

The term "open operational state" means a state in which an electrical current does not flow therethrough.

The term "ADC" means an analog-to-digital voltage converter.

The term "application" means a software application.

The term "hardware abstraction layer" means a layer of programming (e.g., low-level programs or applications) that allows an application to interact with a digital input-output device 214, the first analog-to-digital converter 210, and the second analog-to-digital converter 212 at a general or abstract level rather than at a detailed hardware level.

The battery module 20 includes a positive terminal 90 and a negative terminal 92. In an exemplary embodiment, the battery module 20 generates substantially 48 Vdc between the positive terminal 90 and the negative terminal 92. The positive terminal 90 is electrically coupled to a node 104 of the contactor 30. The negative terminal 92 is electrically coupled to electrical ground.

The contactor 30 has a contact 100, a contactor coil 102, a first node 104, and a second node 106. The first node 104 is electrically coupled to the positive terminal 90 of the battery module 20 utilizing the electrical line 62. The second node 106 is electrically coupled to the electrical load 32 utilizing the electrical line 64. When the microcontroller 56 generates first and second control signals that are received by the voltage driver 34 and the voltage driver 36, respectively, the contactor coil 102 is energized which transitions the contact 100 to a closed operational state. Alternately, when the microcontroller 56 generates third and fourth control signals that are received by the voltage driver 34 and the voltage driver 36, respectively, the contactor coil 102 is de-energized which transitions the contact 100 to an open operational state. In an exemplary embodiment, the third and fourth control signals can each be a ground voltage level.

The voltage driver 34 and the voltage driver 36 are provided to energize or de-energize the contactor coil 102. The voltage driver 34 is electrically coupled to the digital input-output device 214 of the microcontroller 56 utilizing the electrical line 66. The voltage driver 34 is further electrically coupled to a first end of the contactor coil 102 utilizing the electrical line 68. The voltage driver 34 energizes the contactor coil 102, when the voltage driver 34 receives a control signal from the microcontroller 56.

The voltage driver 36 is electrically coupled to the microcontroller 56 utilizing the electrical line 70. The voltage driver 36 is further electrically coupled to a second end of the contactor coil 102 utilizing the electrical line 72. The voltage driver 36 is configured to conduct an electrical current therethrough to the electrical ground for energizing the contactor coil 102, when the voltage driver 36 receives a control signal from the microcontroller 56.

The electrical load 32 is electrically coupled to the second node 106 of the contactor 30. When the contactor 30 has a closed operational state, a positive voltage from the battery module 20 is applied to the electrical load 32 for energizing the electrical load 32. When the contactor 30 has an open operational state, the positive voltage from the battery module 20 is removed from the electrical load 32 which de-energizes the electrical load 32.

The first voltage source 51 outputs a first voltage (e.g., V1). The first voltage source 51 is electrically coupled to the channel 1 of the first analog-to-digital converter 210 utilizing the electrical line 74.

The second voltage source 52 outputs a second voltage (e.g., V2). The second voltage source 52 is electrically coupled to the channel 2 of the first analog-to-digital converter 210 utilizing the electrical line 75.

The third voltage source 53 outputs a third voltage (e.g., V3). The third voltage source 53 is electrically coupled to the channel 1 of the second analog-to-digital converter 212 utilizing the electrical line 76.

The fourth voltage source 54 outputs a fourth voltage (e.g., V4). The fourth voltage source 54 is electrically coupled to the channel 2 of the second analog-to-digital converter 212 utilizing the electrical line 77.

Figure 4:
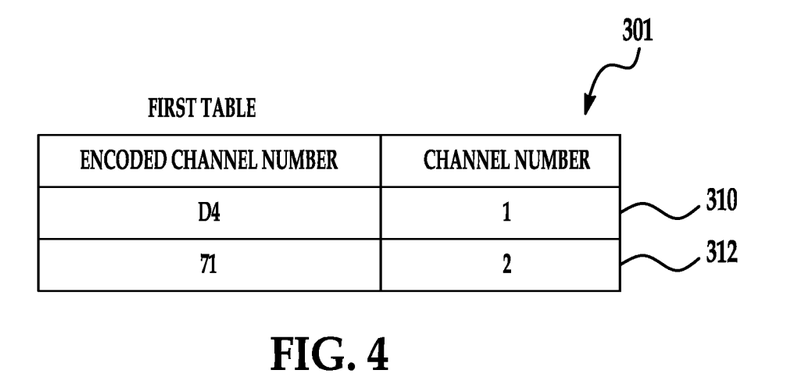
FIG. 4 is an exemplary first table of encoded channel numbers and channel numbers that are associated with first and second channels of the first analog-to-digital converter in the self-diagnosing microcontroller of FIG. 1.
Figure 5:
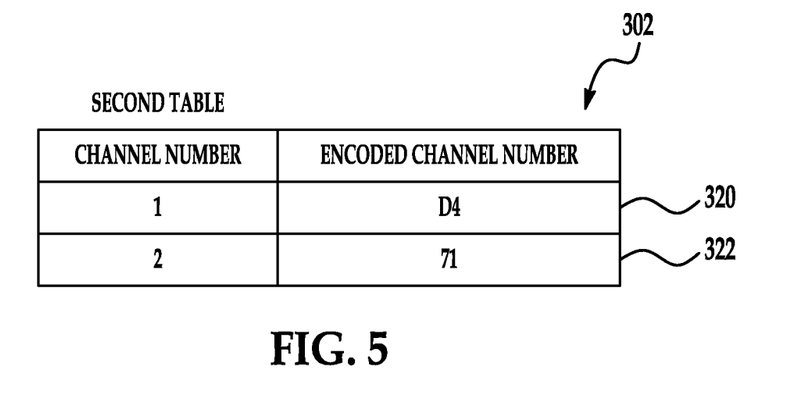
FIG. 5 is an exemplary second table of encoded channel numbers and channel numbers that are associated with first and second channels of the first analog-to-digital converter in the self-diagnosing microcontroller of FIG. 1.

Referring to FIGS. 1, 4 and 5, the microcontroller 56 implements the diagnostic method described herein. In particular, the microcontroller 56 has the microprocessor 200 which accesses a table 400 (shown in FIG. 4) in the memory device 216 and executes a main application 500, a first application 501, a second application 502, a third application 503, a fourth application 504, and the hardware abstraction layer 505 to implement the diagnostic method. The memory device 216 stores software applications utilized by the microprocessor 200. The microprocessor 200 is operably coupled to the memory device 216, the first and second analog-to-digital converters 210, 212, and the digital input-output device 214.

The digital input-output device 214 is electrically coupled to the voltage drivers 34, 36. The digital input-output device 214 outputs control signals that are received by the voltage drivers 34, 36 for controlling the operation of the contactor 30.

Figure 2:
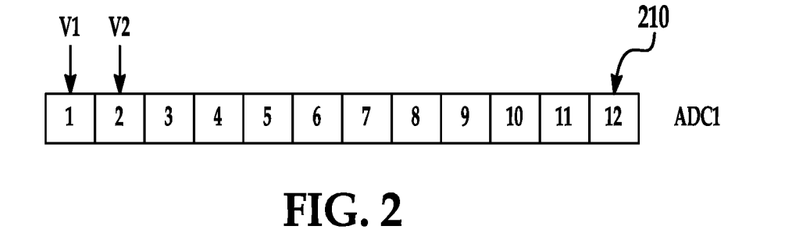
FIG. 2 is a block diagram of a first analog-to-digital converter utilized in the self-diagnosing microcontroller of FIG. 1.

Referring to FIGS. 1 and 2, the first analog-to-digital converter 210 (also referred to as ADC1 herein) is provided to measure voltages from the first and second voltage sources 51, 52. The first analog-to-digital converter 210 includes channels 1-12. The channels 1 and 2 of the analog-to-digital converter 210 are electrically coupled to the first and second voltage sources 51, 52, respectively, utilizing the electrical lines 74, 75, respectively.

Figure 3:
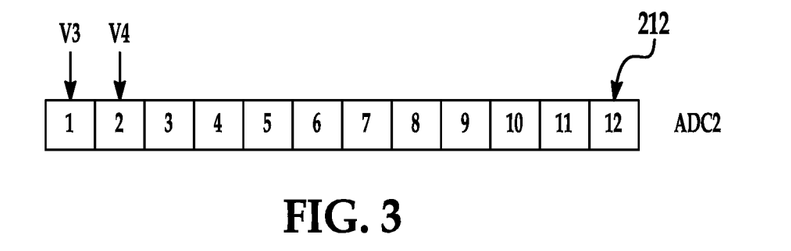
FIG. 3 is a block diagram of a second analog-to-digital converter utilized in the self-diagnosing microcontroller of FIG. 1.

Referring to FIGS. 1 and 3, the second analog-to-digital converter 212 (also referred to as ADC2 herein) is provided to measure voltages from the third and fourth voltage sources 53, 54. The second analog-to-digital converter 212 includes channels 1-12. The channels 1 and 2 of the second analog-to-digital converter 212 are electrically coupled to the third and fourth voltage sources 53, 54, respectively, utilizing the electrical lines 76, 77, respectively.

Figure 7:
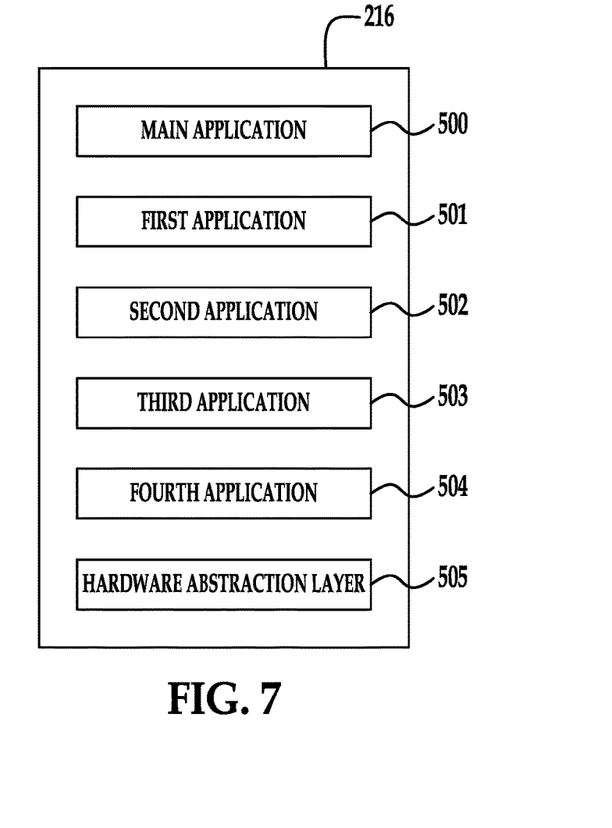
FIG. 7 is a block diagram of a memory device having a main application and first, second, third, fourth applications stored therein, that are utilized by the self-diagnosing microcontroller of FIG. 1.

Referring to FIGS. 4, 5, and 7, the simplified first and second tables 301, 302 will now explained. In particular, the first and second tables 301, 302 each have encoded channel numbers (hexadecimal numbers) and channel numbers and decimal numbers) that are associated with first and second channels (e.g., channels 1 and 2) of the first analog-to-digital converter 210.

The first table 301 includes records 310, 312. The record 310 has an encoded channel number "D4" (hexadecimal number)) and a channel number "1" (decimal number) associated with a first channel of the first analog-to-digital converter 210. The record 312 has an encoded channel number "71" (hexadecimal number) and a channel number "2" (decimal number) associated with a second channel of the first analog-to-digital converter 210.

The second table 302 includes records 320, 322. The record 320 has a channel number "1" (decimal number) and an encoded channel number "D4" (hexadecimal number) associated with a first channel of the first analog-to-digital converter 210. The record 322 has a channel number "2" (decimal number) and an encoded channel number "71" (hexadecimal number) associated with a second channel of the first analog-to-digital converter 210.

Referring to FIGS. 1, 4, 5 and 7, a brief explanation of the diagnostic functionality of the microcontroller 56 for determining whether first and second channels of the first analog-to-digital converter 201 have been correctly read, utilizing the first and second tables 301, 302, will now be explained.

Initially, to measure the voltage V1 (shown in FIG. 1), the first application 501 sends a first encoded channel number "D4" (hexadecimal number) associated with the channel 1 of the first analog-to-digital converter 210 to the hardware abstraction layer 505. In response, the hardware abstraction layer 505 determines an actual channel number "1" (decimal number) of the first analog-to-digital converter 201 by reading a first record 310 of the first table 301 (shown in FIG. 4) utilizing the first encoded channel number "D4" (hexadecimal number) as an index. Next, the hardware abstraction layer 505 obtains the first measured voltage value associated with the first channel number "1" (decimal number) from the channel 1 of the first analog-to-digital converter 210. Next, the hardware abstraction layer 505 determines a second encoded channel number "D4" (hexadecimal number) by reading a first record 320 of a second table 302 utilizing the first channel number "F" (decimal number) from the first table 301 as an index. Next, the hardware abstraction layer 505 determines whether the first encoded channel number "D4" (hexadecimal number) in the record 310 of the first table 301 is equal to the second encoded channel number "D4" (hexadecimal number) in the record 320 of the second table 302. If the first and second encoded channel numbers are not equal to one another (indicating that an incorrect channel has been read from the first analog-to-digital converter 210), the hardware abstraction layer 505 sets a first pre-check indicator to a first fault value indicating that an incorrect channel has been read from the first analog-to-digital converter 210. Next, the hardware abstraction layer 505 sends the first pre-check indicator, the measured voltage value, and the second encoded channel number to the first application 501.

After performing the above steps, the first application 501 performs the following steps to determine whether a second channel of the first analog-to-digital converter 201 has been correctly read.

To measure the voltage V2 (shown in FIG. 1), the first application 501 sends a third encoded channel number "71" (hexadecimal number) associated with the channel 2 of the first analog-to-digital converter 210 to the hardware abstraction layer 505. In response, the hardware abstraction layer 505 determines an actual channel number "2" (decimal number) of the first analog-to-digital converter 201 by reading a second record 312 of the first table 301 (shown in FIG. 4) utilizing the third encoded channel number "71" (hexadecimal number) as an index. Next, the hardware abstraction layer 505 obtains the second measured voltage value associated with the second channel number "2" (decimal number) from the channel 2 of the first analog-to-digital converter 210. Next, the hardware abstraction layer 505 determines a fourth encoded channel number "71" (hexadecimal number) by reading a second record 322 of the second table 302 utilizing the second channel number (e.g., 2) from the first table 301 as an index. Next, the hardware abstraction layer 505 determines whether the third encoded channel number "71" (hexadecimal number) in the record 312 of the first table 301 is equal to the second encoded channel number "71" (hexadecimal number) in the record 322 of the second table 302. If the third and fourth encoded channel numbers are not equal to one another (indicating that an incorrect channel has been read from the first analog-to-digital converter 210), the hardware abstraction layer 505 sets the first pre-check indicator to a first fault value indicating that an incorrect channel has been read from the first analog-to-digital converter 210. Next, the hardware abstraction layer 505 sends the first pre-check indicator, the measured voltage value, and the fourth encoded channel number to the first application 501.

It is noted that the second application 502 utilizes a similar method (as described above respect to the first application 501) for reading each voltage value from the first analog to digital converter 210, and for setting the value of the second pre-check indicator. Further, the third and fourth applications 503, 504 utilize a similar method (as described above respect to the first application 501) for reading each voltage value from the second analog-to-digital converter 212, and for setting the values of the third and fourth pre-check indicators, respectively.

Figure 6:
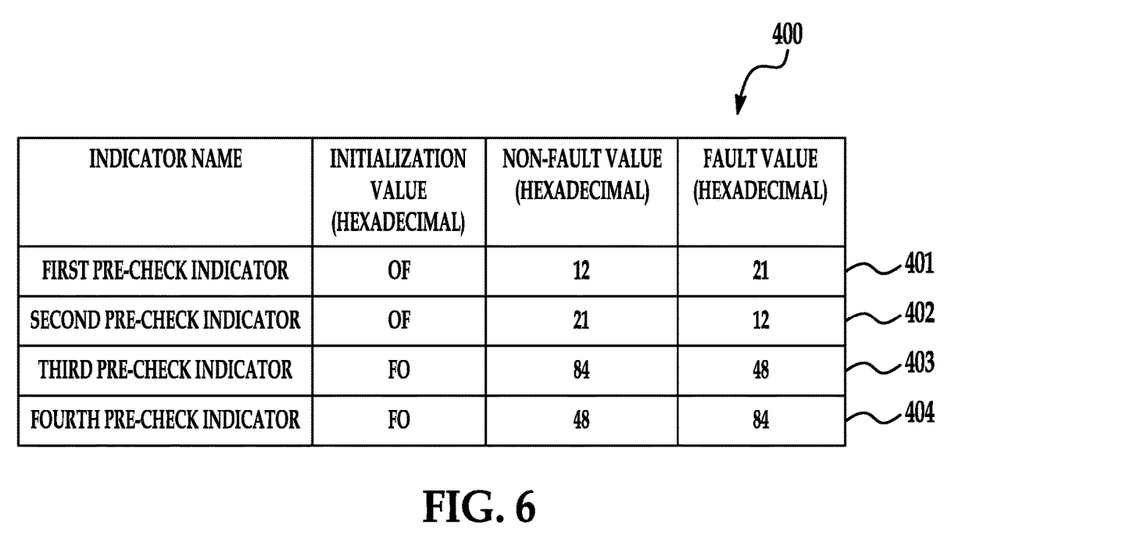
FIG. 6 is an exemplary table of pre-check indicators utilized in the self-diagnosing microcontroller of FIG. 1.

Referring to FIG. 6, a brief description of the table 400 having values for the first, second, third, and fourth pre-check indicators utilized by the diagnostic method described herein will now be explained. The table 400 includes records 401, 402, 403, 404 associated with first, second, third, and fourth pre-check indicators, respectively. Each of the records 401, 402, 403, 404 have initialization value (e.g., hexadecimal number), a non-fault value (e.g., hexadecimal number), and a fault value (e.g., hexadecimal number). Each of the fault values have a Hamming distance of at least four from one another. Also, each of the non-fault values have a Hamming distance of at least four from one another. Further, each of the fault values have a Hamming distance of at least four from the non-fault values.

For example, the record 401 is associated with the first pre-check indicator and includes initialization value "OF" (hexadecimal number), a non-fault value "12" (hexadecimal number), and a fault value "21" (hexadecimal number). Further, the record 402 is associated with the second pre-check indicator and includes initialization value "OF" (hexadecimal number), a non-fault value "21" (hexadecimal number), and a fault value "12" (hexadecimal number). Further, the record 403 is associated with the third pre-check indicator and includes initialization value "F0" (hexadecimal number), a non-fault value "84" (hexadecimal number), and a fault value "48" (hexadecimal number). Further, the record 404 is associated with the fourth pre-check indicator and includes initialization value "F0" (hexadecimal number), a non-fault value "48" (hexadecimal number), and a fault value "84" (hexadecimal number).

Referring to FIGS. 1 and 9-12, a flowchart of a diagnostic method for the self-diagnosing microcontroller 56 in accordance with another exemplary embodiment will now be explained. The flowchart includes the main application 500, the first application 501, the second application 502, the third application 503, and the fourth application 504.

Figure 8:
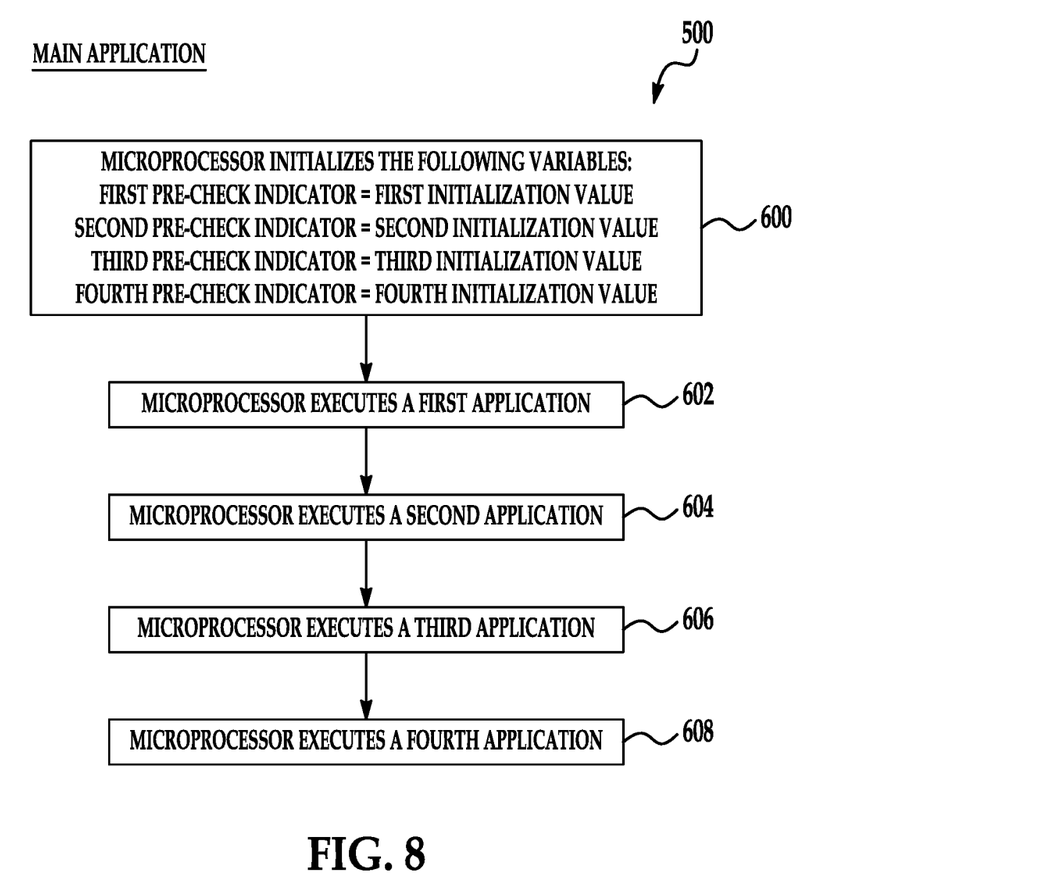
FIGS. 8-12 are flowcharts of a diagnostic method utilized by the self-diagnosing microcontroller of FIG. 1.

Referring to FIGS. 1 and 8, the main application 500 will now be explained.

At step 600, the microprocessor 200 initializes the following variables:
first pre-check indicator=first initialization value;
second pre-check indicator=second initialization value;
third pre-check indicator=third initialization value;
fourth pre-check indicator=fourth initialization value.

At step 602, the microprocessor 200 executes a first application 501.

At step 604, the microprocessor 200 executes a second application 502.

At step 606, the microprocessor 200 executes a third application 503.

At step 608, the microprocessor 200 executes a fourth application 504.

Figure 9:
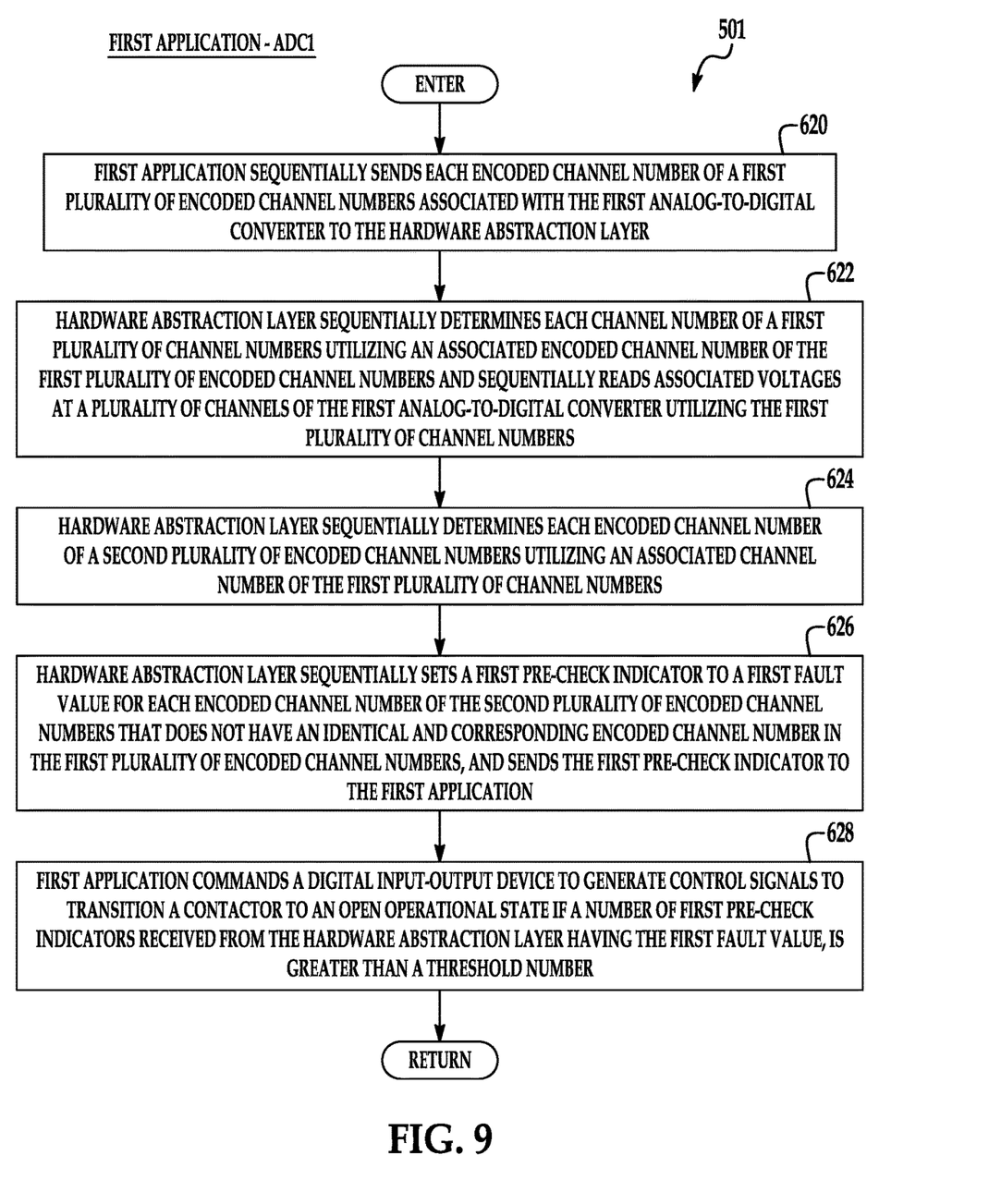

Referring to FIGS. 1 and 9, the first application 501 will now be explained.

At step 620, the first application 501 sequentially sends each encoded channel number of a first plurality of encoded channel numbers associated with the first analog-to-digital converter 210 to the hardware abstraction layer 505.

At step 622, the hardware abstraction layer 505 sequentially determines each channel number of a first plurality of channel numbers utilizing an associated encoded channel number of the first plurality of encoded channel numbers and sequentially reads associated voltages at a plurality of channels of the first analog-to-digital converter 210 utilizing the first plurality of channel numbers.

At step 624, the hardware abstraction layer 505 sequentially determines each encoded channel number of a second plurality of encoded channel numbers utilizing an associated channel number of the first plurality of channel numbers.

At step 626, the hardware abstraction layer 505 sequentially sets a first pre-check indicator to a first fault value for each encoded channel number of the second plurality of encoded channel numbers that does not have an identical and corresponding encoded channel number in the first plurality of encoded channel numbers, and sends the first pre-check indicator to the first application 501.

At step 628, the first application 501 commands a digital input-output device 214 to generate control signals to transition a contactor 30 to an open operational state if a number of first pre-check indicators received from the hardware abstraction layer 505 having the first fault value, is greater than a threshold number.

Figure 10:
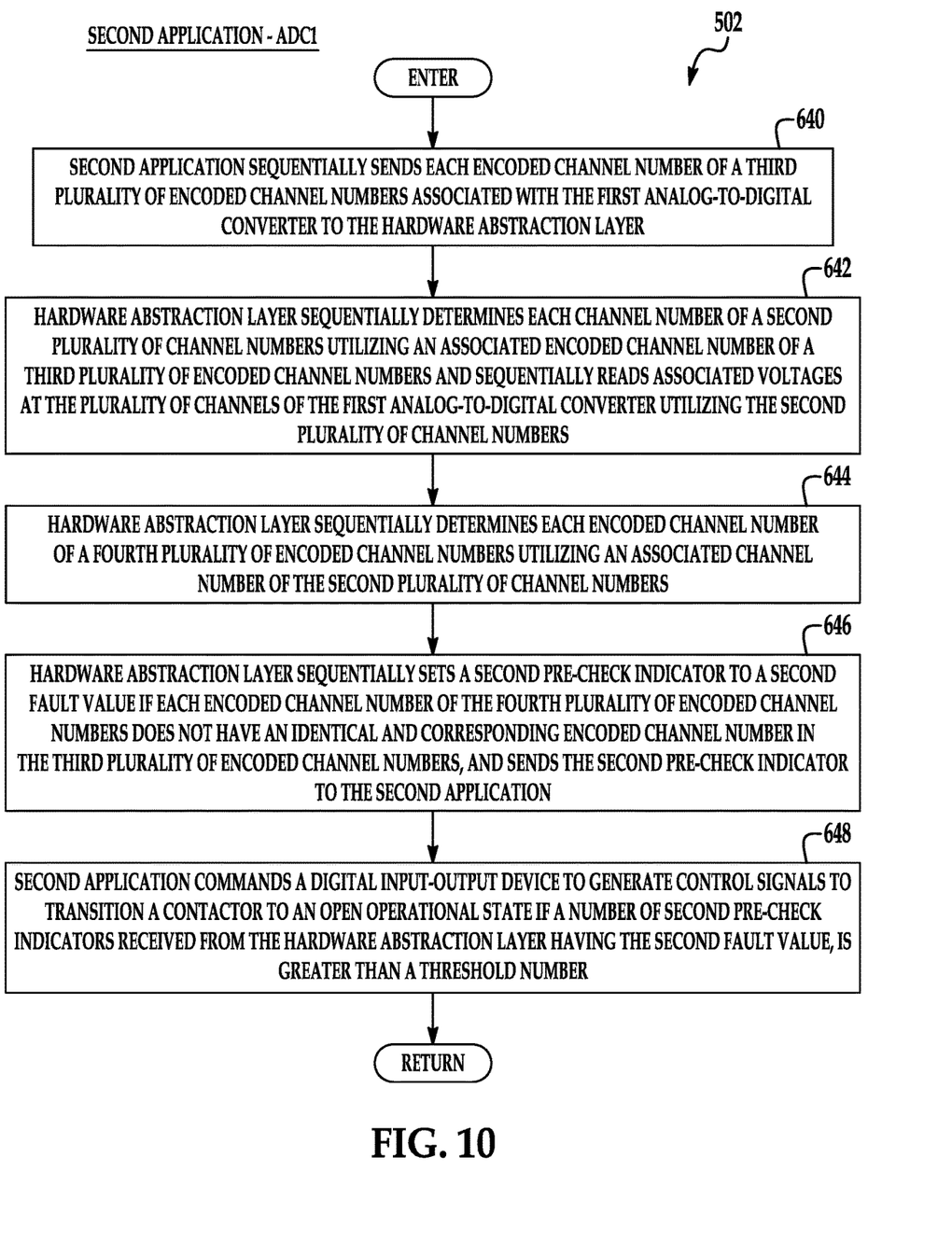

Referring to FIGS. 1 and 10, the second application 502 will now be explained.

At step 640, the second application 502 sequentially sends each encoded channel number of a third plurality of encoded channel numbers associated with the first analog-to-digital converter 210 to the hardware abstraction layer 505.

At step 642, the hardware abstraction layer 505 sequentially determines each channel number of a second plurality of channel numbers utilizing an associated encoded channel number of a third plurality of encoded channel numbers and sequentially reads associated voltages at the plurality of channels of the first analog-to-digital converter 210 utilizing the second plurality of channel numbers.

At step 644, the hardware abstraction layer 505 sequentially determines each encoded channel number of a fourth plurality of encoded channel numbers utilizing an associated channel number of the second plurality of channel numbers.

At step 646, the hardware abstraction layer 505 sequentially sets a second pre-check indicator to a second fault value if each encoded channel number of the fourth plurality of encoded channel numbers does not have an identical and corresponding encoded channel number in the third plurality of encoded channel numbers, and sends the second pre-check indicator to the second application 502.

At step 648, the second application 502 commands a digital input-output device 214 to generate control signals to transition a contactor 30 to an open operational state if a number of second pre-check indicators received from the hardware abstraction layer 505 having the second fault value, is greater than a threshold number.

Figure 11:
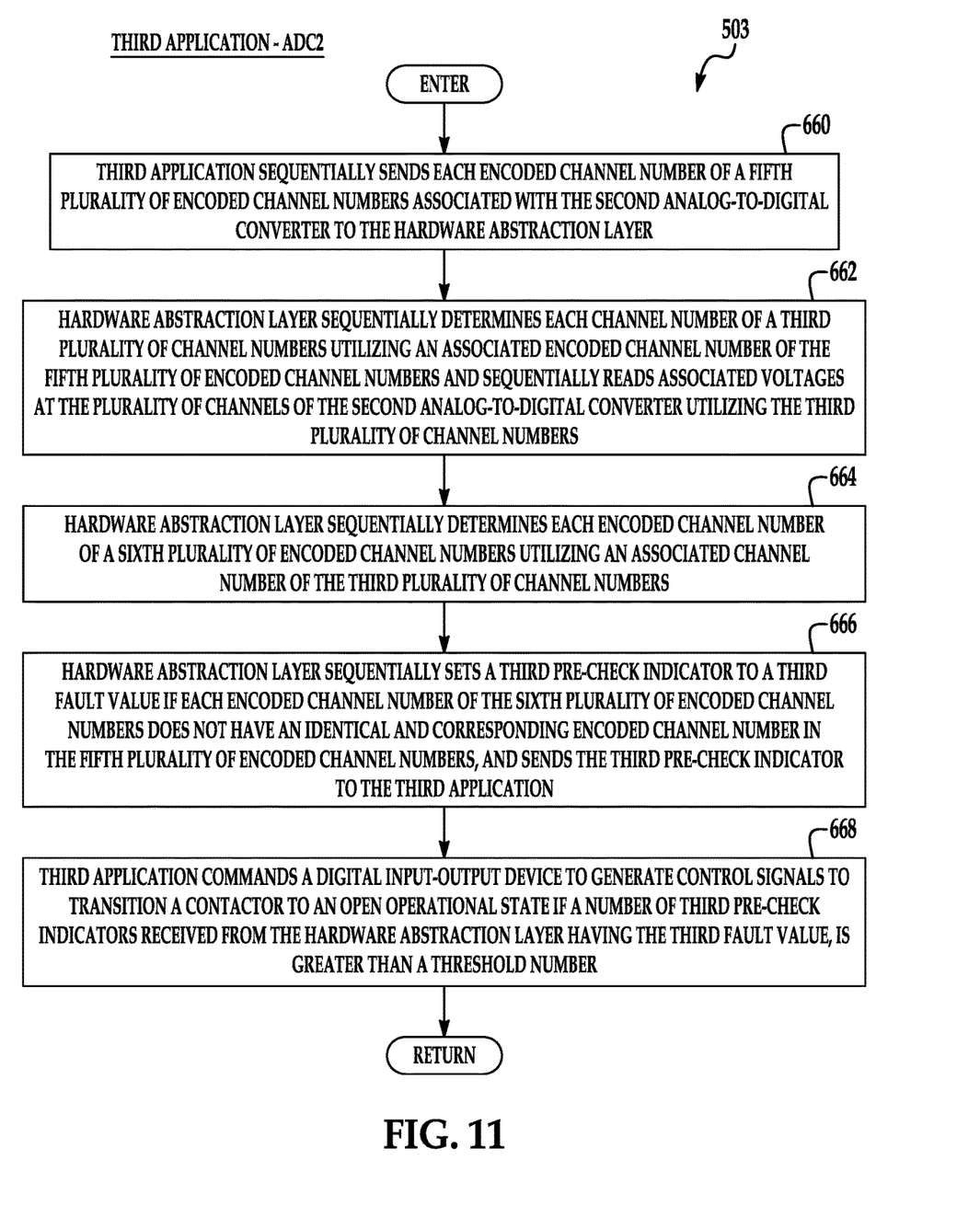

Referring to FIGS. 1 and 11, the third application 503 will now be explained.

At step 660, the third application 503 sequentially sends each encoded channel number of a fifth plurality of encoded channel numbers associated with the second analog-to-digital converter 212 to the hardware abstraction layer 505.

At step 662, the hardware abstraction layer 505 sequentially determines each channel number of a third plurality of channel numbers utilizing an associated encoded channel number of the fifth plurality of encoded channel numbers and sequentially reads associated voltages at the plurality of channels of the second analog-to-digital converter 212 utilizing the third plurality of channel numbers.

At step 664, the hardware abstraction layer 505 sequentially determines each encoded channel number of a sixth plurality of encoded channel numbers utilizing an associated channel number of the third plurality of channel numbers.

At step 666, the hardware abstraction layer 505 sequentially sets a third pre-check indicator to a third fault value if each encoded channel number of the sixth plurality of encoded channel numbers does not have an identical and corresponding encoded channel number in the fifth plurality of encoded channel numbers, and sends the third pre-check indicator to the third application 503.

At step 668, the third application 503 commands a digital input-output device 214 to generate control signals to transition a contactor 30 to an open operational state if a number of third pre-check indicators received from the hardware abstraction layer 505 having the third fault value, is greater than a threshold number.

Figure 12:
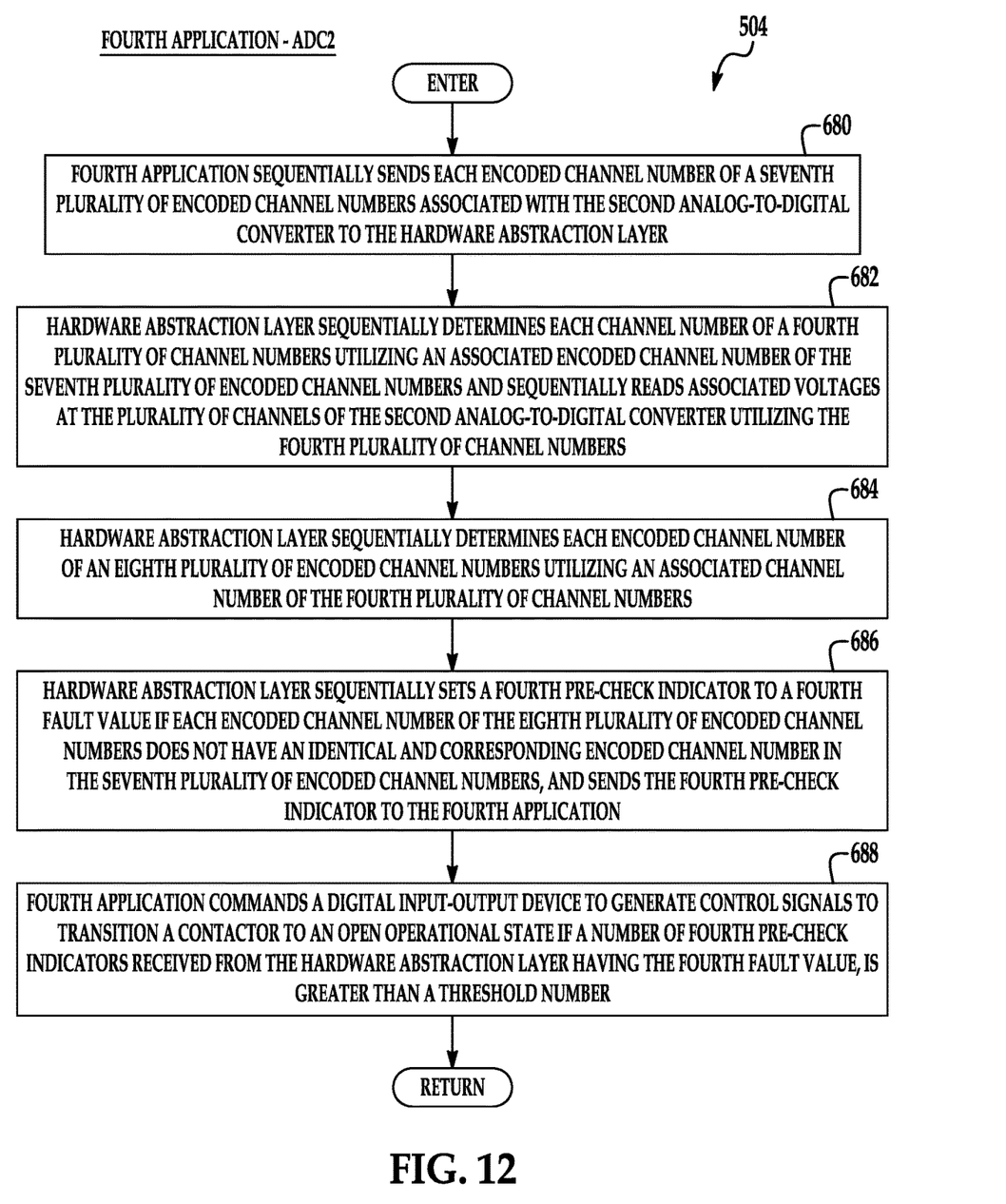

Referring to FIGS. 1 and 12, the fourth application 504 will now be explained.

At step 680, the fourth application 504 sequentially sends each encoded channel number of a seventh plurality of encoded channel numbers associated with the second analog-to-digital converter 212 to the hardware abstraction layer 505.

At step 682, the hardware abstraction layer 505 sequentially determines each channel number of a fourth plurality of channel numbers utilizing an associated encoded channel number of the seventh plurality of encoded channel numbers and sequentially reads associated voltages at the plurality of channels of the second analog-to-digital converter 212 utilizing the fourth plurality of channel numbers.

At step 684, the hardware abstraction layer 505 sequentially determines each encoded channel number of an eighth plurality of encoded channel numbers utilizing an associated channel number of the fourth plurality of channel numbers.

At step 686, the hardware abstraction layer 505 sequentially sets a fourth pre-check indicator to a fourth fault value if each encoded channel number of the eighth plurality of encoded channel numbers does not have an identical and corresponding encoded channel number in the seventh plurality of encoded channel numbers, and sends the fourth pre-check indicator to the fourth application 504.

At step 688, the fourth application 504 commands a digital input-output device 214 to generate control signals to transition a contactor 30 to an open operational state if a number of fourth pre-check indicators received from the hardware abstraction layer 505 having the fourth fault value, is greater than a threshold number.

The diagnostic system described herein provides a substantial advantage over other systems. In particular, the diagnostic system described herein utilizes first and second applications to each confirm whether correct channels in an analog-to-digital converter are being read, and sets first and second pre-check indicators (each associated with all of the channels in the analog-to-digital converter) to a fault value if incorrect channels are being read from the analog-to-digital converter.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A self-diagnosing microcontroller, comprising:
a microprocessor having first and second applications, and a hardware abstraction layer; the microprocessor being operably coupled to a first analog-to-digital converter;
the first application sequentially sending each encoded channel number of a first plurality of encoded channel numbers associated with the first analog-to-digital converter to the hardware abstraction layer;
the hardware abstraction layer sequentially determining each channel number of a first plurality of channel numbers utilizing an associated encoded channel number of the first plurality of encoded channel numbers and sequentially reading associated voltages at a plurality of channels of the first analog-to-digital converter utilizing the first plurality of channel numbers;
the hardware abstraction layer sequentially determining each encoded channel number of a second plurality of encoded channel numbers utilizing an associated channel number of the first plurality of channel numbers; and
the hardware abstraction layer sequentially setting a first pre-check indicator to a first fault value for each encoded channel number of the second plurality of encoded channel numbers that does not have an identical and corresponding encoded channel number in the first plurality of encoded channel numbers, and sending the first pre-check indicator to the first application.

2. The self-diagnosing microcontroller of claim 1, wherein:
the first application commanding a digital input-output device to generate control signals to transition a contactor to an open operational state if a number of first pre-check indicators received from the hardware abstraction layer having the first fault value, is greater than a threshold number.

3. The self-diagnosing microcontroller of claim 1, wherein:
the microprocessor further having a second application;
the second application sequentially sending each encoded channel number of a third plurality of encoded channel numbers associated with the first analog-to-digital converter to the hardware abstraction layer;
the hardware abstraction layer sequentially determining each channel number of a second plurality of channel numbers utilizing an associated encoded channel number of a third plurality of encoded channel numbers and sequentially reading associated voltages at the plurality of channels of the first analog-to-digital converter utilizing the second plurality of channel numbers;
the hardware abstraction layer sequentially determining each encoded channel number of a fourth plurality of encoded channel numbers utilizing an associated channel number of the second plurality of channel numbers; and
the hardware abstraction layer sequentially setting a second pre-check indicator to a second fault value if each encoded channel number of the fourth plurality of encoded channel numbers does not have an identical and corresponding encoded channel number in the third plurality of encoded channel numbers, and sending the second pre-check indicator to the second application.

4. The self-diagnosing microcontroller of claim 3, wherein:
the second application commanding a digital input-output device to generate control signals to transition a contactor to an open operational state if a number of second pre-check indicators received from the hardware abstraction layer having the second fault value, is greater than a threshold number.

5. The self-diagnosing microcontroller of claim 3, wherein the first fault value has a Hamming distance of at least four from the second fault value.

6. The self-diagnosing microcontroller of claim 3, wherein:
the microprocessor further having a third application, the microprocessor being further operably coupled to a second analog-to-digital converter;
the third application sequentially sending each encoded channel number of a fifth plurality of encoded channel numbers associated with the second analog-to-digital converter to the hardware abstraction layer;
the hardware abstraction layer sequentially determining each channel number of a third plurality of channel numbers utilizing an associated encoded channel number of the fifth plurality of encoded channel numbers and sequentially reading associated voltages at the plurality of channels of the second analog-to-digital converter utilizing the third plurality of channel numbers;
the hardware abstraction layer sequentially determining each encoded channel number of a sixth plurality of encoded channel numbers utilizing an associated channel number of the third plurality of channel numbers; and
the hardware abstraction layer sequentially setting a third pre-check indicator to a third fault value if each encoded channel number of the sixth plurality of encoded channel numbers does not have an identical and corresponding encoded channel number in the fifth plurality of encoded channel numbers, and sending the third pre-check indicator to the third application.

7. The self-diagnosing microcontroller of claim 6, wherein:
the third application commanding a digital input-output device to generate control signals to transition a contactor to an open operational state if a number of third pre-check indicators received from the hardware abstraction layer having the third fault value, is greater than a threshold number.

8. The self-diagnosing microcontroller of claim 6, wherein:
the microprocessor further having a fourth application;
the fourth application sequentially sending each encoded channel number of a seventh plurality of encoded channel numbers associated with the second analog-to-digital converter to the hardware abstraction layer;
the hardware abstraction layer sequentially determining each channel number of a fourth plurality of channel numbers utilizing an associated encoded channel number of the seventh plurality of encoded channel numbers and sequentially reading associated voltages at the plurality of channels of the second analog-to-digital converter utilizing the fourth plurality of channel numbers;
the hardware abstraction layer sequentially determining each encoded channel number of an eighth plurality of encoded channel numbers utilizing an associated channel number of the fourth plurality of channel numbers; and
the hardware abstraction layer sequentially setting a fourth pre-check indicator to a fourth fault value if each encoded channel number of the eighth plurality of encoded channel numbers does not have an identical and corresponding encoded channel number in the seventh plurality of encoded channel numbers, and sending the fourth pre-check indicator to the fourth application.

9. The self-diagnosing microcontroller of claim 8, wherein:
the fourth application commanding a digital input-output device to generate control signals to transition a contactor to an open operational state if a number of fourth pre-check indicators received from the hardware abstraction layer having the fourth fault value, is greater than a threshold number.

10. The self-diagnosing microcontroller of claim 8, wherein the third fault value has a Hamming distance of at least four from the fourth fault value.

* * * * *